United States Patent
Downing

[11] 3,729,782
[45] May 1, 1973

[54] CLAMP ASSEMBLY WITH TUBULAR SADDLE MEMBER

[75] Inventor: Todd R. Downing, Tinley Park, Ill.

[73] Assignee: Maremont Corporation, Chicago, Ill.

[22] Filed: Apr. 18, 1972

[21] Appl. No.: 245,169

[52] U.S. Cl. ................................................24/277
[51] Int. Cl. ..........................................B65d 63/00
[58] Field of Search............................285/420, 199; 248/74 R; 24/277

[56] References Cited
UNITED STATES PATENTS 2,719,345   10/1955   Riker......................................24/277
3,126,934   3/1964   Marx et al. ........................285/420 X
3,137,053   6/1964   Osborn et al...........................24/277
3,605,214   9/1971   Spotts et al...............................24/277

Primary Examiner—Donald A. Griffin
Attorney—Cushman, Darby & Cushman

[57] ABSTRACT

A clamp assembly for effecting a substantially gas-tight connection between the telescoping end portions of two thin-walled tubes, such as exhaust system parts or the like, embodying an improved saddle member in the form of a rigid tubular structure having inwardly open end sections which receive the clamping forces and a central tube engaging section to which the clamping forces are transmitted in a manner similar to the loading of a beam to impart clamping pressure to the tube connection throughout the periphery thereof.

9 Claims, 6 Drawing Figures

Patented May 1, 1973 3,729,782
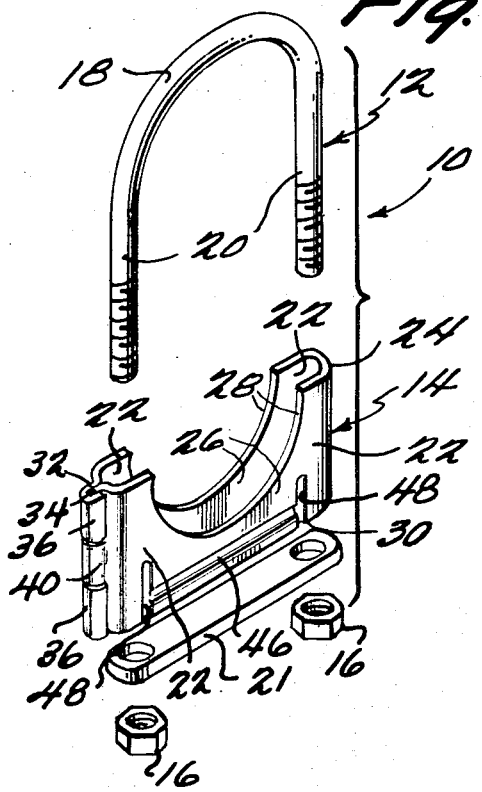

CLAMP ASSEMBLY WITH TUBULAR SADDLE MEMBER

This invention relates to thin-walled tube connections and more particularly to an improved clamp assembly for effecting a substantially gas-tight connection between two thin-walled tubes, such as exhaust system parts or the like, in which the tubes have end portions disposed in telescoping relation.

There are basically two types of clamp assemblies presently utilized in effecting a substantially gas-tight connection between the telescoping end portions of thin-walled tubes such as utilized in exhaust systems. Both of these types embody essentially the same combination of component parts, namely, a U-shaped bolt, a saddle member and nuts which threadedly engage the ends of the legs of the U-shaped bolt and cooperate with the saddle member to effect securement. The two types differ in the construction of the saddle member. One type of saddle member is exemplified by the constructions such as disclosed in the patent to Riker, U.S. Pat. No. 2,719,345, dated Oct. 4, 1955 and Osborn et al., U.S. Pat. No. 3,137,053, dated June 16, 1964. The saddle member disclosed in these patents is formed of sheet metal into a configuration which provides a pair of tubular end sections through which the legs of the U-bolt extend and a guillotine section extending centrally between the two tubular sections. A characteristic of this type of saddle member is that the guillotine section provides a deforming line contact with the periphery of the outer tube to be connected through a peripheral extent of approximately 180° with both end sections providing an extension of such contact to a full 180° by a pair of axially diverging surfaces. As noted in the specifications of the above-mentioned patents disclosing the guillotine type clamp, these clamp assemblies provide the required substantially gas-tight connection by deforming the thin-walled tubes connected inwardly with the interior surface of the bight portion of the U-bolt and the central guillotine section and divergent surfaces of the end sections providing substantially 360° contact throughout the periphery of the tubes.

The second general type of saddle member presently in widespread use is likewise formed of sheet metal, the formation including essentially a central bottom wall and two side walls extending upwardly from opposite sides of the central wall having arcuate tube engaging surfaces formed on the upper edge thereof. The bottom wall is suitably apertured to receive the legs of the U-bolt. An example of a conventional saddle member of this type is disclosed in U.S. Pat. No. 3,199,815. A saddle member of this type does not provide the guillotine type action of the first-mentioned type but rather relies upon the spaced peripheral contact of the saddle member to effect a substantially gas-tight connection.

While these two conventional types of clamp assemblies have provided reasonable performance, with the greater attention now being focused on the need for exhaust systems to be more efficient from a polutant-emission standpoint, there exists a greater need to provide a clamp assembly which will effect a substantial gas-tight connection with a greater efficiency that heretofore provided. One of the disadvantages noted in the prior art clamp assemblies is that while the leakage factor can be reduced by applying greater torque to the clamp assembly during installation, oftentimes the clamp assemblies of the prior art will fail as greater installation torques are applied before a satisfactory minimum leakage rate can be obtained. One type of failure which occurs is that the metal of the saddle member is so stressed beyond its elastic limit that rapid collapse or yielding of the metal occurs as incremental additions of torque are applied.

An object of the present invention is the provision of a clamp assembly having an improved saddle member in the form of a tubular structure which can be simply and economically manufactured providing end sections closed at opposite sides and at the outer ends thereof but open at the inner ends thereof, in which the sides of the end sections are formed at their inner end portions with spaced wall portions, the saddle member including spaced side walls rigidly joined with the spaced wall portions of the end sections to provide in effect two parallel beams which are loaded at their ends during the installation of the assembly along the end sections, which loading is transmitted directly to the side walls so as to deflect the same substantially within the elastic limit of the side wall metal with a lateral component of deflection at the tube engaging edges thereof which increases in a direction away from the center or midpoint of the side walls, thus imparting a controlled radially inward compression to the tubes being connected throughout substantially the entire exterior periphery thereof.

Another object of the present invention is the provision of a clamp assembly embodying an improved saddle member of the type described which is simple in construction, effective in operation, economical to manufacture, and which is capable of being re-used due to lack of substantial deformation beyond the elastic limit of the metal embodied therein even when installed with substantial torque.

These and other objects of the present invention will become more apparent during the course of the following detailed description and appended claims.

The invention may best be understood with reference to the accompanying drawings wherein illustrative embodiments are shown.

In the drawings:

FIG. 1 is an exploded perspective view of a clamp assembly embodying the principles of the present invention;

FIG. 2 is a vertical sectional view through the telescoping end portions of a pair of thin-walled tubes showing the clamp assembly of FIG. 1 in an operative position with respect thereto;

FIG. 3 is a sectional view taken along the line 3—3 of FIG. 2;

FIG. 4 is an enlarged sectional view taken along the line 4—4 of FIG. 2;

FIG. 5 is a view similar to FIG. 4 showing a modified construction; and

FIG. 6 is a view similar to FIG. 4 showing a further modified construction.

Referring now more particularly to the drawings, there is shown in FIGS. 1-3 thereof a clamp assembly, generally indicated at 10, embodying the principles of the present invention. As best shown in FIG. 1, the clamp assembly 10 includes essentially three main components, namely, a U-bolt, generally indicated at 12, a saddle member, generally indicated at 14, and a pair of nuts 16.

The clamp assembly 10 is assembled in conventional fashion, one operative position of the assembly with respect to the telescoping end portions of a pair of thin-walled tubes being shown in FIG. 2. With reference to FIG. 2, it will be noted that the saddle member 14 is disposed in an operative position below the two telescoping tubes in engagement with the lower half of the exterior periphery of the outer tube, while the U-bolt 12 is disposed in engagement with the upper half of the periphery of the outer tube. For the sake of convenience, the description which follows refers to the clamp assembly 10 and its component parts in an operative position such as shown in FIG. 2. It will be understood, however, that the assembly is capable of operation with the component parts oriented in positions other than that shown in FIG. 2 so that terms such as "bottom", "top", "vertical", "horizontal", etc. are used herein in a relative sense and should be construed with respect to a clamp assembly disposed in an operative position such as shown in FIG. 2.

The U-bolt 12 may be of any conventional construction and in the embodiment shown is formed in conventional fashion from a rod of circular cross-section bent to provide a bight portion 18 and a pair of leg portions 20. The bight portion 18 is semi-circular in configuration providing an interior tube contacting surface having a radius generally equal to the radius of the exterior periphery of the outer tube. It will be understood that the U-bolt 12 may be of the type in which the bight portion has a flattened cross-sectional configuration rather than the same circular cross-sectional configuration as the leg portions 20. The leg portions 20 of the U-bolt extend from the ends of the bight portion 18 tangentially in parallel relation. In accordance with conventional practice, the free end portions of the legs 20 are threaded to receive the nuts 16. It is preferable to utilize some sort of washer means in conjunction with the U-bolt 12 and nuts 16. One desirable embodiment of washer means is shown in FIGS. 1-3 in the form of a single strap 21 having two apertures formed therein for receiving the legs 20 of the U-bolt 12. It will be understood, however, that conventional ring washers may be utilized or that the nuts may be integrally formed with washer means thereon.

The present invention is more particularly concerned with the construction of the saddle member 14. In accordance with the principles of the present invention, the saddle member 14 is in the form of a rigid tubular structure. The essential characteristics of the saddle member embodying the principles of the present invention can best be understood by considering the tubular structure as providing a pair of end sections which perform in cooperation with the legs 20 of the U-bolt 12 the function of receiving the clamping forces applied by the tightening of the nuts 16 and a central section extending between the end sections which performs in cooperation with the bight portion of the U-bolt 12 the function of applying peripheral clamping or sealing pressure to the outer tube of the connection.

Each end section is closed at its sides and outer end and open at its inner end. The open inner end portion of each end section is formed by a pair of spaced vertically extending wall portions 22 and the remaining closed outer end portion is formed by a vertically extending central wall portion 24 interconnecting the wall portions 22. In the preferred embodiment of FIGS. 1-3, each central interconnecting wall portion 24 is arcuate in horizontal section extending approximately 180° with an interior radius slightly greater than the radius of the circular cross-section of the leg portions 20 of the U-bolt 12. The spaced wall portions 22 extend generally tangentially from the central wall portions 24 a distance generally equal to the radius of the circular cross-section of the legs 20 of the U-bolt 12 and are spaced apart a distance slightly greater than the diameter of the leg portions 20.

While it is preferred to form the central connecting wall portions 24 with an arcuate configuration having a radius slightly greater than the radius of the leg portions of the U-bolt, it will be understood that the connecting wall portions 24 may assume other configurations as, for example, a flat end wall portion having two parallel flat portions extending from the ends thereof into rigid interengagement with the end wall portions 22. With such a construction, it will be understood that the interior dimensions of the end sections would still loosely receive the leg portions 20 of the U-bolt, just as is the case with the preferred construction shown. Likewise, the junctures between such a flat end wall and parallel side wall portions could be filleted with a radius of any desired dimension, the semi-circular connecting wall portion 24 representing a fillet of a radius equal to a dimension slightly greater than the radius of the circular cross-section of the leg portions 20, as aforesaid.

The central section of the saddle member 14 is preferably in the form of a pair of spaced side walls 26 extending between associated pairs of end wall portions 22 for a horizontal distance generally equal to the interior diameter of the bight portion 18 of the U-bolt 12. As shown, the side walls 26 are in general alignment with the associated end wall portions 22 and are spaced apart a distance slightly greater than the diameter of the leg portions 20 in the same way as the end wall portions 22 of each end section.

The side walls 26 are formed with upwardly facing arcuate tube engaging edges or surfaces 28. These edges have an arcuate extent of at least 180° and preferably extend slightly more than 180° as, for example, approximately 5° beyond a full semi-circular arcuate extent adjacent each end section 22. The radius of curvature is generally equal to the radius of the outer periphery of the outer tube or generally the same as the radius of the interior surface of the bight portion 18 of the U-bolt.

As best shown in FIGS. 2 and 3, the tubular structure of the saddle member 14 is formed with downwardly facing edges 30 disposed in a horizontal plane. The edges 30 provided by each end section are adapted to be engaged by the washer means of the nuts 16 when the clamp assembly is installed. While it is preferred to form the lower nut engaging edges 30 provided by the end sections co-planar with the edges 30 provided by the side walls, it will be understood that this relationship is not entirely essential and may be varied somewhat to suit the particular installation.

The manner in which the basic tubular structure of the saddle member 14 is formed can be varied. In the preferred embodiment shown in FIG. 1, the tubular structure is formed by punching a blank from a flat sheet of metal having attaching flange portions 32 and 34 on opposite ends thereof, bending the blank upon itself, and then rigidly securing the attaching flange portions 32 and 34 together. A preferred in-line locking tab arrangement for effecting the rigid securement of the flange portions 32 and 34 is best shown in FIGS. 1 and 4. This preferred arrangement includes the provision of a pair of vertically spaced locking tabs 36 extending outwardly from the upper and lower ends of the attaching flange 32 and a central locking tab 38 extending outwardly from the other attaching flange 34. To effect securement with this arrangement, the attaching flanges 32 and 34 are first brought together in abutting relation and the locking tabs 36 and 38 are then bent over the corresponding portion of the opposite attaching flanges 34 and 32 respectively. To maintain the finished tab joint in line, the central portion of the attaching flange 32 containing the central locking tab 38 is bent outwardly, as indicated at 40, into alignment with the bent-over tabs 36 and the central portion of the attaching flange 34 between tabs 38 is correspondingly offset, as indicated at 42. The in-line arrangement is preferred because the resultant joint is relatively free from exposed sharp edges between the upper and lower ends thereof.

It will be understood, however, that it is within the contemplation of the present invention to utilize an offset locking tab arrangement wherein the central portions of the attaching flanges are not bent as at 40 and 42. Such an arrangement is shown in FIG. 5. Both arrangements provide interlocking horizontal surfaces which insure against vertical displacement between the flanges and the associated portions of the adjacent end section during operation. Of course, the in-line arrangement provides for even greater horizontal interlocking than the offset arrangement.

While an interlocking tab arrangement is preferred, the attaching flanges can be rigidly interconnected by other means. FIG. 6 illustrates a rigid securement by means of projection welding. In this embodiment, the attaching flange 32 is initially provided with a series of vertically spaced projections on the surface thereof which abuts the attaching flange 34, such projections being provided by forming dimples in the attaching flange 32, as indicated at 44. During the welding operation, these projections become fused to the mating flange so that in the finished joint the surfaces of the flanges 32 and 34 are in abutment.

Where the tubular structure of the saddle member is formed from flat sheet metal as indicated above, it is preferable to form strengthening rib means in the side walls 26 to reduce the tendency of the side walls to bow outwardly by an inherent spring action. A preferred strengthening rib is shown in FIGS. 1–4 as being in the form of a horizontally elongated inwardly deformed central rib 46, each end of which intersects with a vertical rib 48 at the approximate midpoint thereof. Each vertical rib 48 is formed in an end wall portion 22 and extends downwardly to the associated edge 30 at a position which forms a partial closure in the lower portion of the associated end section. These partial closures of the end section channels form arcuate extensions of the arcuate end walls 26 within which the legs 20 of the U-bolt 12 are received.

Other variations for forming the basic tubular structure include flattening a cylindrical tube, either of the seamless or seamed variety, and utilizing two substantially identical blanks formed from flat stock rigidly interconnected at both ends in the manner previously described.

In operation, all of the above described embodiments of the present invention serve to effect a substantial gas-tight connection between the telescoping end portion of two tubes by the same functional principles. In this regard, it will be noted that when the clamp assembly 10 is installed in operative position with respect to the telescopic end portions of the two tubes, the nuts 16 are tightened into engagement with the edge surfaces 30 of the end sections of the saddle member 14. The tightening of the nuts serves to move the bight portion of the U-bolt in a direction toward the arcuate edges 28 of the saddle member to insure pressure-tight engagement with the exterior periphery of the outer tube end. As greater incremental torques are applied to the nuts 16, the forces exerted thereby are received on the edges 30 of the end sections and transmitted vertically upwardly. The vertical disposition of the walls forming the end sections not only serves to provide a strong structure for receiving these forces but in addition, serves to transmit the forces to the side walls with a bending action similar to that provided by a simple beam. This bending action is enhanced by virtue of the fact that the vertical dimension of the side walls is a minimum at the mid-portion thereof and increases outwardly in both directions. With this construction, the forces applied by tightening the nuts 16 tend to deflect the tube engaging surfaces 28 laterally inwardly an increasing amount from a minimum at the mid-point of the side walls to a maximum adjacent the end sections. Since the end sections are in alignment with and rigidly secured to the side walls, the forces applied to the end sections load the side walls as a beam minimizing the tendency for the saddle member to bend or yield in a transverse direction. The amount of bending is, of course, dependent upon the torque applied to the nuts but under normal circumstances the amount of bending is substantially within the elastic limit of the metal forming the tubular structure of the saddle member 14. It will be understood that the deflection, as aforesaid, substantially within the elastic limit of the metal of the tubular member, provides a radially inward clamping pressure to the outer periphery of the tube substantially throughout its entire peripheral extent. With the present construction it is a relatively simple matter to provide for the extension of the arcuate tube engaging surfaces 28 beyond a 180° curvature. This construction insures a high degree of peripheral contact and pressure which achieves an especially effective gas-tight connection without metal failure.

It will be understood that while it is preferred to provide the tube engaging surfaces 28 with extensions beyond the 180° curvature which are arcuate and form a continuation of the arcuate surface of the edges 28, the extension may be tangential with only a slight loss of effectiveness resulting. The preferred arcuate extension construction does not interfere substantially with the mounting of the saddle member in engagement with the exterior surface of the outer tube. The slight inward extension of the surface does not substantially interfere with the mounting of the saddle member which can be accomplished simply by a slight pressure.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:

1. A clamp assembly for effecting a substantially gastight connection between two thin-walled tubes such as exhaust system parts or the like having end portions disposed in telescoping relation comprising a U-bolt having a bight portion defining a semi-circular inner peripheral surface of a size to engage in an operative position the upper exterior periphery of the outer tube end portion and a pair of legs extending tangentially therefrom in parallel relation, said legs being of circular cross-section and having the exterior periphery thereof adjacent the free end portions thereof threaded, nut means for threadedly engaging the threaded free end portion of each of said U-bolt legs, and a saddle member in the form of a rigid tubular sheet metal structure including a pair of U-bolt leg receiving end sections and a central tube engaging section rigidly interconnecting said end sections, each of said end sections including vertically extending wall means defining a vertically extending channel closed along its sides and outer end and opened along its inner end for receiving in generally loosely confined relation a leg of said U-bolt, the wall means of each end section including spaced end wall portions defining the open inner end portion of the associated channel, said central section consisting of a pair of generally horizontally spaced vertically extending side walls rigidly joined with corresponding end wall portions of said end sections and extending therebetween with a horizontal extent generally equal to the diameter of the interior tube engaging surface of said U-bolt bight portion, the upper portion of said side walls and the upper portion of said end wall portions being planar and providing a pair of upper concavely arcuate tube engaging parallel edges spaced apart a distance slightly greater than the diameter of the legs of said U-bolt, each of said arcuate edges having a radius generally equal to the radius of the interior surface of said U-bolt bight portion and an arcuate extent of at least approximately 180°, said end sections providing downwardly facing edges disposed in a flat horizontal plane for receiving the upward forces applied by threadedly engaging said nut means on said U-bolt legs with the bight portion thereof in engagement with the upper periphery of the outer tube and the tube engaging edges of said saddle member in engagement with the lower periphery of the outer tube, which upward forces oppose the downward forces applied to said U-bolt thereby, the vertical extent of said side walls being smallest at the mid-portions thereof and increasing therefrom toward both of said end sections so that the upward forces applied to said end sections when said clamp is engaged as aforesaid will effect a horizontal inward deflection of said side walls substantially within their elastic limit which is maximum adjacent the junctions of the upper tube engaging edges thereof with said end sections and decreases to a minimum adjacent the mid-portions thereof so as to insure radially inward clamping pressure on said tubes throughout the entire exterior periphery thereof.

2. A clamp assembly as defined in claim 1 wherein the arcuate extent of said pair of upper concavely arcuate tube engaging edges is of the order of 190°.

3. A clamp assembly as defined in claim 1 wherein each of said side walls is of an integral flat planar construction having horizontally extending reinforcing ribs formed inwardly therein adjacent the lower portions thereof.

4. A clamp assembly as defined in claim 3 wherein each of said end wall portions is of an integral flat planar construction having vertically extending reinforcing ribs formed inwardly therein adjacent the lower portions thereof.

5. A clamp assembly as defined in claim 4 wherein said side walls include downwardly facing edges coplanar with the downwardly facing edges of said end sections.

6. A clamp assembly as defined in claim 1 wherein the wall means of one of said end sections includes an arcuate wall portion of an arcuate extent of approximately 90° joined integrally with and extending tangentially from each associated end wall portion and an attaching flange extending outward from said arcuate wall portion, and means for rigidly securing said attaching flanges together in abutting engagement.

7. A clamp assembly as defined in claim 6 wherein said flange securing means includes a pair of vertically spaced locking tabs formed on one of said attaching flanges and bent over the other and a central locking tab formed on the other of said attaching flanges and bent over said one attaching flange.

8. A clamp assembly as defined in claim 7 wherein the central portions of said attaching flanges are bent so as to be in alignment with the tabs bent thereover.

9. A clamp assembly as defined in claim 6 wherein the wall means of the other of said end sections includes an arcuate wall portion of an arcuate extent of 180° extending between the associated end wall portions and integrally joined therewith, said end wall portions being integrally joined with said side walls.

* * * * *